(12) United States Patent
Otsuka

(10) Patent No.: US 6,320,827 B1
(45) Date of Patent: Nov. 20, 2001

(54) OPTICAL DISC REPRODUCING APPARATUS

(75) Inventor: Hitoshi Otsuka, Higashishirakawa-gun (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/537,893

(22) Filed: Mar. 29, 2000

(30) Foreign Application Priority Data

Jun. 4, 1999 (JP) .................................................. 11-157923

(51) Int. Cl.[7] .................................................. G11B 17/22
(52) U.S. Cl. .............................. 369/34; 386/125; 386/126
(58) Field of Search .................................. 369/32, 33, 34; 386/125, 126

(56) References Cited

U.S. PATENT DOCUMENTS

| | | | |
|---|---|---|---|
| 4,949,322 | * 8/1990 | Kimura et al. | .......................... 369/32 |
| 5,293,362 | 3/1994 | Sakurai et al. | . |
| 6,157,597 | * 12/2000 | Fleming, III | ............................ 369/32 |

FOREIGN PATENT DOCUMENTS

| | | |
|---|---|---|
| 0 844 614 A2 | 5/1998 | (EP) . |
| 5-128693 | 5/1993 | (JP) . |
| 10-275407 | 10/1998 | (JP) . |
| WO99/12164 | 8/1999 | (WO) . |

\* cited by examiner

Primary Examiner—Aristotelis M. Psitos
(74) Attorney, Agent, or Firm—Dickstein Shapiro Morin & Oshinsky LLP (57) ABSTRACT

The present invention makes it possible to reproduce an optical disc in random reproduction or programmed reproduction without interrupting reproduction, even though discs such as a DVD or CD-I with an interactive function are not removed from the roulette. A mechanical unit 1 selects a target optical disc 103 to be reproduced from among a plurality of optical discs accommodated in a roulette 702. A disc detection unit 204 detects the type of the optical disc which is selected as the target to be reproduced. A system controller unit 5 allows reproduction only in a case where the target optical disc to be reproduced is a CD-DA, when the reproduction mode entered to the user interface block unit 6 is either a random-reproduction mode or a programmed-reproduction mode.

4 Claims, 5 Drawing Sheets

OPTICAL DISC REPRODUCING APPARATUS

BACKGROUND OF THE INVENTION

1. Field of the Invention

The present invention relates to an optical disc reproducing apparatus which is capable of accommodating a plurality of optical discs, for example, DVDs (Digital Versatile Disc), CDs (Compact Disc) and the like, and selecting a specified optical disc from among the accommodated plurality of optical discs to reproduce it.

2. Description of Related Art

In recent years, optical disc reproducing apparatus which are capable of accommodating a plurality of two kinds of optical discs, DVDs and CDs, have become increasingly popular.

Figure 4:
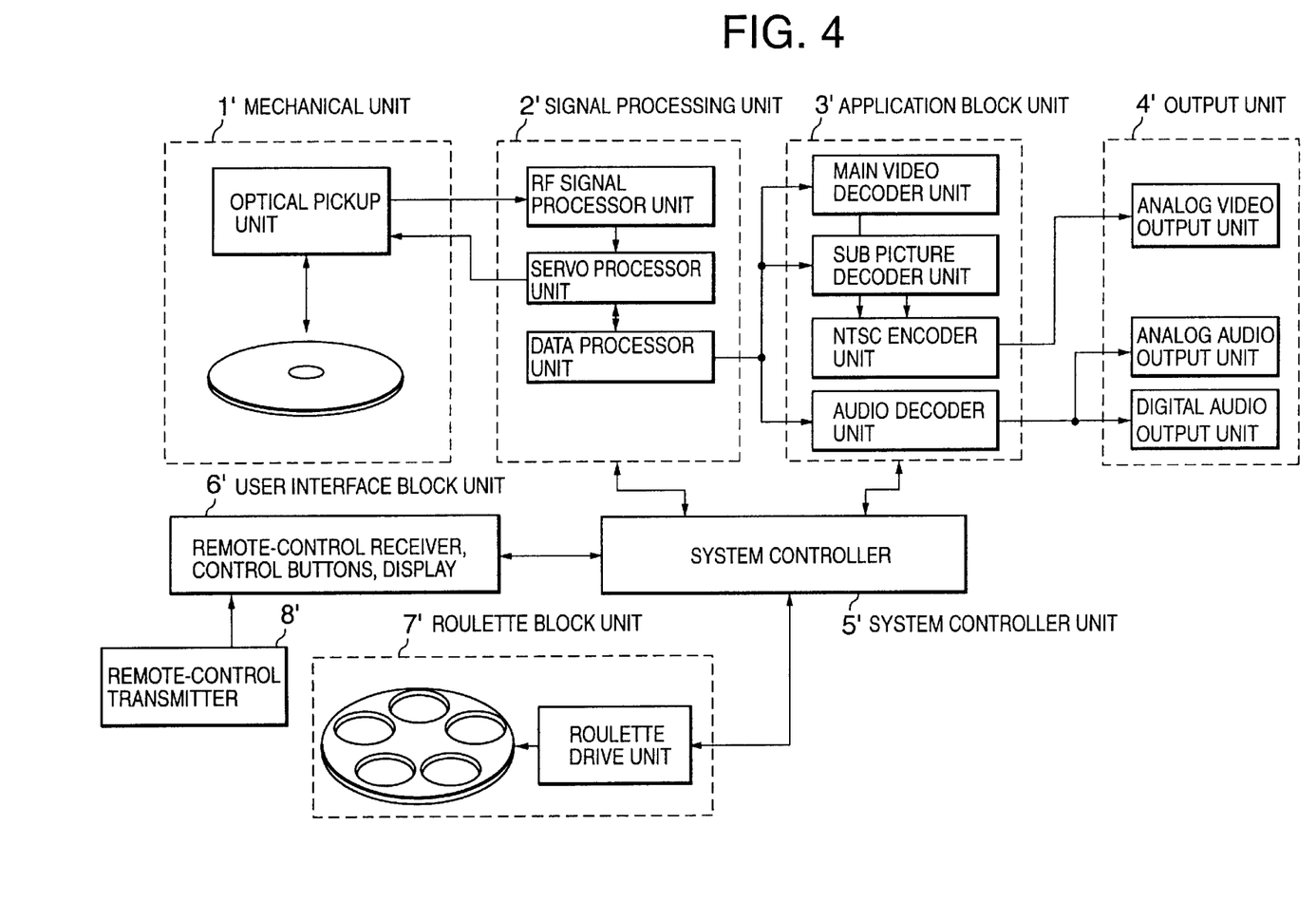
FIG. 4 is a block diagram showing a configuration of a conventional optical disc reproducing apparatus.

FIG. 4 is a block diagram showing a configuration of a conventional optical disc reproducing apparatus.

As shown in the figure, the conventional optical disc reproducing apparatus comprises: a mechanical unit 1' having an optical pickup unit; a signal processing unit 2' for demodulating signals detected by the optical pickup unit; an application block unit 3' for decoding video signals, sub video signals and audio signals from the data output by the signal processing unit 2'; an output unit 4' for outputting the decoded video picture signals, sub video signals and audio signals to external devices; a user interface block unit 6' for receiving operation instruction from an operator and displaying the operating contents to the operator; a system controller 5' for controlling the general operation of the optical disc reproducing apparatus; a roulette block unit 7' for accommodating a plurality of optical discs, and for selecting an optical disc which is specified from among the accommodated optical discs and transferring it to the mechanical unit 1'.

Next the reproducing procedure of the above-described conventional optical disc reproducing apparatus will be explained.

Figure 5:
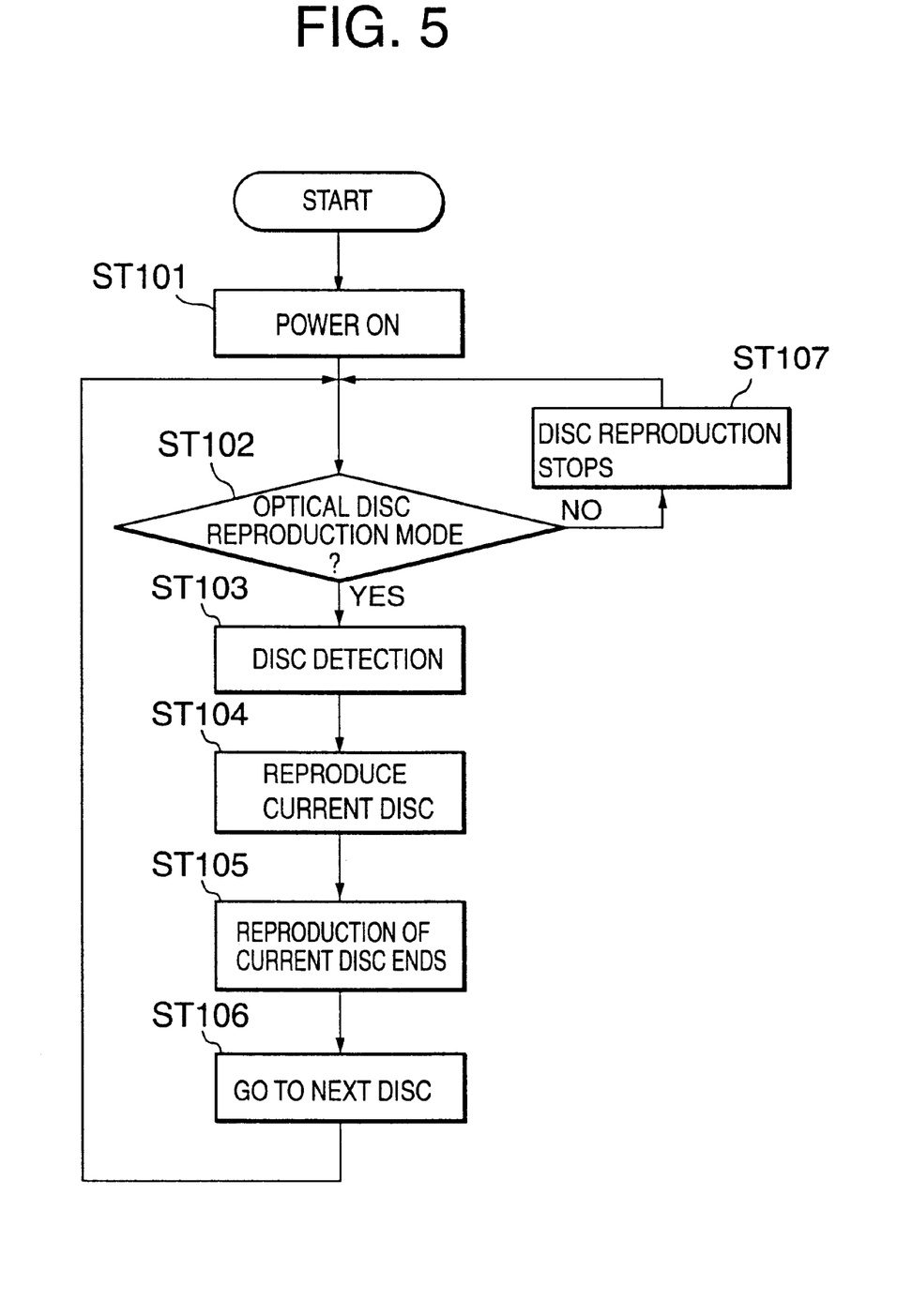
FIG. 5 is a flowchart showing the operation of the conventional optical disc reproducing apparatus.

FIG. 5 is a flowchart which explains the reproducing procedure of the conventional optical disc reproducing apparatus.

First, a power source of the optical disc reproducing apparatus is turned ON (ST101), and when reproduction of the optical disc is instructed by pressing the control buttons provided on the user interface block unit 6' (ST102), operation changes to the optical disc reproduction mode.

As long as operation is not in the optical disc reproduction mode, or in other words, unless reproduction of the optical disc is instructed, the optical disc reproducing apparatus will be in the disc reproduction stop mode (ST107).

After operation changes to the optical disc reproduction mode, the roulette block unit 7' conveys the optical disc, which is specified for reproduction, to the mechanical unit 1'. Then, the signal processing unit 2', according to a signal detected by the optical pickup unit, detects whether the target optical disc to be reproduced is a CD or a DVD (ST103).

In this case, detecting whether the optical disc is a CD or a DVD is performed by reading the disc information recorded on the optical disc. It is also possible to detect whether the optical disc is a CD or a DVD without reading the disc information. One example of this technology is disclosed in Japanese patent publication No. H10-275407. The explanation of this technology is omitted here.

Next, after detection of the type of optical disc by the signal processing unit 2' is finished, the system controller 5' switches all of the units of the optical disc reproducing apparatus to a signal-processing circuit which corresponds to the detected optical disc type, then, starts reproducing the optical disc (ST104).

After the reproduction of the optical disc under reproduction ends (ST105), the system controller 5' controls the roulette block unit 7' and rotates the roulette to convey the optical disc to be reproduced next to the mechanical unit 1 (ST106). Then steps ST102 to ST105 are repeated.

SUMMARY OF THE INVENTION

Of this kind of optical disc reproducing apparatus, there are some having a so-called random reproduction function for continuously reproducing the accommodated optical discs at random, and there are some having a so-called programmed reproduction function for selectively reproducing some of the accommodated optical discs in a predetermined order.

By the way, DVD differs from CD-DA (Compact Disc-Digital Audio) in that there is an interactive function in which the operator and optical disc reproducing apparatus correspond interactively for reproducing the optical disc. Therefore, disc reproduction may not advance if the operator does not press a control button on the user-interface block unit 6. Accordingly, when the optical disc having the interactive function is left in the reproduction state for a while, the reproduction of the optical disc may be stopped temporarily in the pause state.

There are also some CDs, such as CD-I (Compact Disc-Interactive media), which have an interactive function. Similar to DVD, when a CD-I is left in the reproduction state, reproduction of the CD-I may be stopped temporarily in the pause state when the CD-I is reproduced.

The physical format of a CD-I is a format conforming to mode 2 of a CD-ROM (Compact Disc Read-only Memory) and differs from the physical format of a CD-DA. Accordingly, in order to reproduce a CD-I, it is necessary to have a CD-I decoder or a CD-ROM decoder instead of a CD-DA decoder.

As described above, when performing random reproduction or programmed reproduction with a conventional optical disc reproducing apparatus, the optical disc reproducing apparatus stops in the pause state when the operator forgets to remove the interactive optical disc such as DVD or CD-I from the roulette, and random reproduction or programmed reproduction may be interrupted even though random reproduction or programmed reproduction is specified.

Therefore, when performing random reproduction or programmed reproduction with a conventional optical disc reproducing apparatus, it is troublesome that the operator has to remove the DVD or CD-I having the interactive function from the roulette.

In consideration of the conditions mentioned above, the object of the present invention is to make it possible to perform random reproduction or programmed reproduction without interrupting reproduction, even though the operator does not remove the interactive optical disc such as a DVD or CD-I.

To accomplish the above described object, a first embodiment of the present invention provides an optical disc reproducing apparatus capable of accommodating a plurality of different kinds of optical discs, comprising:

disc detection means for detecting the kind of optical disc;
  disc selection means for selecting an optical disc to be reproduced from among the accommodated optical discs; and mode receiving means for receiving a reproduction instruction including at least one of a random-reproduction mode for continuously reproducing the accommodated optical discs at random and a programmed-reproduction mode for selectively reproducing the accommodated optical discs in a predetermined order, wherein:

the disc selection means only selects optical discs from among the accommodated optical discs which are detected by the disc detection means to be a CD-DA (Compact Disc-Digital Audio), when a reproduction instruction in the aforementioned random-reproduction mode or programmed-reproduction mode is received by the mode receiving means from the operator.

With this embodiment of the invention, when optical discs having an interactive function such as a DVD or a CD-I are accommodated, these optical discs are not selected as a target optical disc to be reproduced in the random-reproduction mode or programmed-reproduction mode. Therefore, it is possible to perform random reproduction or programmed reproduction without interrupting reproduction, even though the operator does not remove optical discs having an interactive function from the present optical disc reproducing apparatus.

In order to accomplish the above described object, a second embodiment of the invention provides an optical disc reproducing apparatus capable of accommodating a plurality of different kinds of optical discs, comprising:

disc detection means for detecting whether an optical disc has any interactive program tracks;

disc selection means for selecting an optical disc to be reproduced from among the accommodated optical discs; and mode receiving means for receiving a reproduction instruction including at least one of a random-reproduction mode for continuously reproducing the accommodated optical discs at random and a programmed-reproduction mode for selectively reproducing the accommodated optical discs in a predetermined order, wherein:

the disc-selection means only selects optical discs from among the accommodated optical discs which are detected by the disc detection means to have no interactive program tracks, when a reproduction instruction in the random-reproduction mode or programmed-reproduction mode is received by the mode receiving means.

With this embodiment of the invention, in addition to the effects of the first embodiment of the invention mentioned above, it is possible to add DVD to the target optical discs to be reproduced in the random-reproduction mode or programmed-reproduction mode as far as the DVD does not have the interactive function.

DETAILED DESCRIPTION OF THE PREFERRED EMBODIMENTS

A first embodiment of the present invention will be explained.

Here, an optical disc reproducing apparatus capable of accommodating a plurality of DVDs (Digital Versatile Disc) and CDs (Compact Discs) and selecting a specified optical disc from among the plurality of accommodated optical discs to reproduce it is explained as an example.

Figure 1:
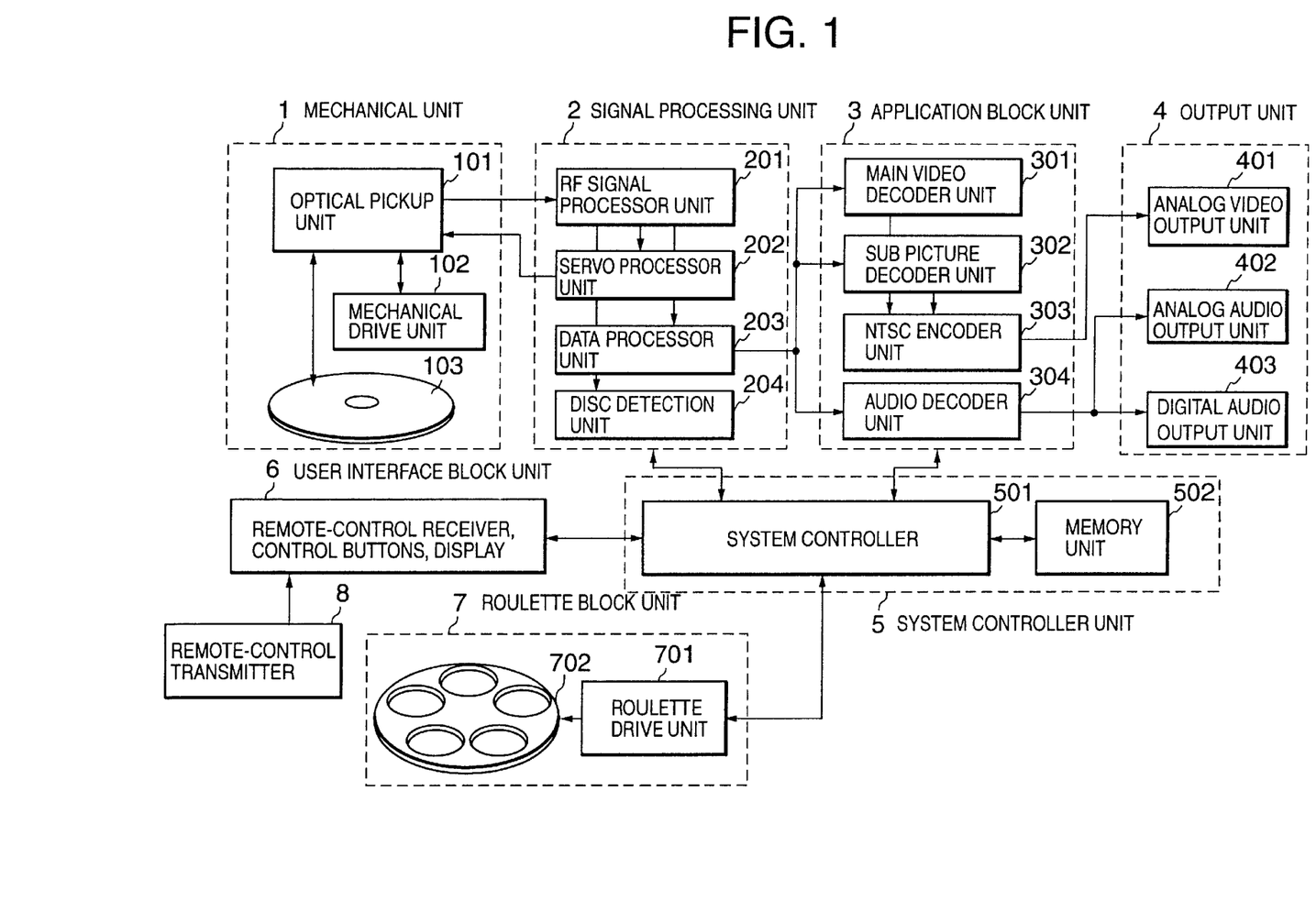
FIG. 1 is a block diagram showing a configuration of an optical disc reproducing apparatus to which a first embodiment of the present invention is applied.

FIG. 1 is a block diagram showing the configuration of an optical disc reproducing apparatus to which a first embodiment of the present invention is applied.

As shown in the figure, the optical disc reproducing apparatus of this embodiment comprises: a mechanical unit 1, a signal processing unit 2, an application block unit 3, an output unit 4, a system controller unit 5, a user interface block unit 6 and a roulette block unit 7.

First, the mechanical unit 1 comprises an optical pickup unit 101 for CD and DVD for detecting recording information recorded on an optical disc 103 which is placed on a turntable, and a mechanical-drive unit 102 having a slide motor and spindle motor.

It is not shown in the figure, however, the mechanical-drive unit 102 comprises a pickup-feed mechanism for moving the optical pickup 101 in the radial direction of the optical disc, and a disc-loading mechanism for placing the optical disc 103, which is in a roulette 702 described later, on the turntable.

Also not shown in the figure, however, the optical pickup 101 comprises a red laser diode, an optical component for irradiating the recorded layer of the optical disc 103 with the laser beam emitted from the red laser diode, a photo detector for detecting the laser beam which is reflected from the optical disc and a current and voltage conversion circuit for converting a weak optoelectric current signal detected y the photo detector to a voltage signal to and amplifying it.

Next, the signal processing unit 2 comprises an RF signal processing unit 201 for amplifying the signal detected by the optical pickup 101 and detecting an error signal, a servo processor unit 202 for controlling the slide motor and spindle motor of the optical pickup unit 101 and mechanical drive unit 102, a data processor unit 203 for performing demodulation and error correction on the data output by the RF signal processor unit 201, and a disc detection unit 204 for detecting whether the optical disc 103 is a CD or a DVD.

Not shown in the figure, however, the RF signal processor unit 201 comprises a waveform circuit for forming the signal detected by the optical pickup unit 101 to a waveform that can be accurately detected. A servo-error signal for controlling optical pickup, such as trackingerror signals and focusing-error signals, is detected from the signal output from the waveform circuit. Also, the RF signal processor unit 201 controls the current flowing into the laser diode so that the beam emitted from the laser diode of the optical pickup unit 101 is proper.

The servo processor unit 202 controls the spindle motor or the like of the mechanical drive unit 102 that operates the tracking servo and focusing servo of the optical pickup unit 101 for CD and DVD, the slide-motor servo of the mechanical drive unit 102, and the CLV (Constant Linear Velocity) servo that keeps the linear velocity of the optical disc constant.

The data processor unit 203 performs error correction of reproduction data using 8–14 demodulation for converting the 14-bit signal detected from a CD to 8-bit data and CIRC (Cross Interleave Read Solomon Code). In addition, the data processor unit 203 performs error correction of reproduction data using 8–16 demodulation for converting the 16-bit signal detected from a DVD to 8-bit data and RSPC (Read Solomon Product Code).

The disc detection unit 204 detecting by the focusingerror signal output from the RF signal processing unit 201 whether the optical disc is a CD or a DVD. The physical structures of a CD and a DVD are different, and their waveforms of the focusing-error signal differ due to differences in the distance between the incident surface and the information recorded surface (disc thickness). By utilizing this difference in waveform, it is possible to detect the type of optical disc.

By utilizing the difference in waveform of the focusing-error signal, in this way, it is possible to detect the disc type without reading the disc information recorded on the optical disc. In comparison with the method of detecting the optical disc type by reading the disc information recorded on the optical disc, this method has an advantage in that it can detect the optical disc type in a shorter period of time. One example of technology of detecting the optical disc type with this kind of method is disclosed in Japanese patent publication No. H10-275407, and so a detailed explanation of detecting the optical disc type will be omitted here.

Next, the application block unit 3 comprises a main video decoder unit 301 for decoding the main video signal from the data output from the signal processing unit 2, a sub picture decoder unit 302 for decoding the sub picture signal from the data output from the signal processing unit 2, an NTSC encoder unit 303 for encoding the digital video signals output from the main video decoder unit 301 and sub picture decoder unit 302 to an NTSC format video signal, and an audio decoder unit 304 for decoding audio data.

The main video decoder unit 301 demodulates the main video data that have been compressed in conformity with the MPEG-2 (Moving Picture Experts Group 2) standard and converts a main video signal for squeezed video signal which is ready to a wide-screen television (vertical-to-horizontal screen ratio of 9:16), to a main video signal for a normal television screen (vertical-to-horizontal screen ration of 3:4).

The sub picture decoder unit 302 demodulates sub picture data and converts it to a sub picture signal. The sub picture signal is mixed and output with the main video signal.

The NTSC encoder unit 303 converts the mixed main video signal and sub picture signal to a video signal in NTSC format. In addition, it controls the analog copy guard and CGMS-A (Copy Generation Management System-Analog) copy limits.

The audio decoder unit 304 demodulates audio data which have been compressed, multi-channeled and modulated, or demodulates audio data which have been modulated by linear PCM (Pulse Code Modulation).

Next, the output unit 4 amplifies and outputs externally the video signal and audio signal which are output from the application block unit 3. The output unit 4 comprises an analog video output unit 401 for outputting the video data encoded in NTSC format by the NTSC encoder unit 303 as a composite signal and a component signal; an analog audio output unit 402 for converting audio data demodulated by the audio decoder unit 304 into a left-right 2-channel analog signal through a DIA converter (Digital to Analog Converter) and outputting that signal; and a digital audio output unit 403 for outputting the audio data demodulated by the audio decoder unit 304 as a digital signal in conformity with digital audio interface standards.

The user interface block unit 6 comprises control buttons for receiving operating instructions from the operator for the optical disc reproducing apparatus; a remote control-receiver for receiving operating instructions from the operator through an remote control transmitter 8 for the optical disc reproducing apparatus; and a fluorescent lamp display for displaying the operating state of the optical disc reproducing apparatus. In addition, the user interface block unit 6 also has a signal interface function for demodulating signals received by the remote-control receiver and transferring them to the system controller 501 of the system controller unit 5.

The roulette block unit 7 selects a specified optical disc from a plurality of optical discs and conveys it to the mechanical unit 1. The roulette block unit 7 comprises a roulette 702 capable of accommodating a plurality of optical discs, and a roulette drive unit 701 for rotating the roulette 702.

The system controller unit 5 comprises a system controller 501 and a memory unit 502.

The memory unit 502 stores information indicating the optical disc type assigned to the accommodation positions in the roulette 702 therein. In addition, when the reproduction mode is programmed reproduction, it stores the reproduction order of the optical discs.

The system controller 501 performs general control of all of the parts of the optical disc reproducing apparatus according to instructions that are input by the operator through the control buttons on the user interface block unit 6. For example, when the operator selects the random-reproduction mode and inputs the reproduction instruction, the system controller 501 controls all of the units to select at random optical discs in the roulette 702 and play them. When the operator selects the programmed-reproduction mode and inputs the reproduction instruction, the system controller 501 controls all of the units to select the optical discs from the roulette 702 in the order of tracks (songs) to be reproduced, which was programmed in the memory unit 502, and reproduces them. Furthermore, when the operator inputs the reproduction order of songs in the programmed reproduction mode through the control buttons provided on the user interface block unit 6 or through the remote-control transmitter 8, the system controller 501 stores the reproduction order in the memory unit 502.

Moreover, the system controller 501 assigns information indicating the optical disc type, which was detected by the disc detection unit 204, to the number of the disc accommodation position in the roulette 702 which holds the optical discs, and stores the information in the memory unit 502.

Next, the reproduction operation of the optical disc reproducing apparatus described above will be explained.

Figure 2:
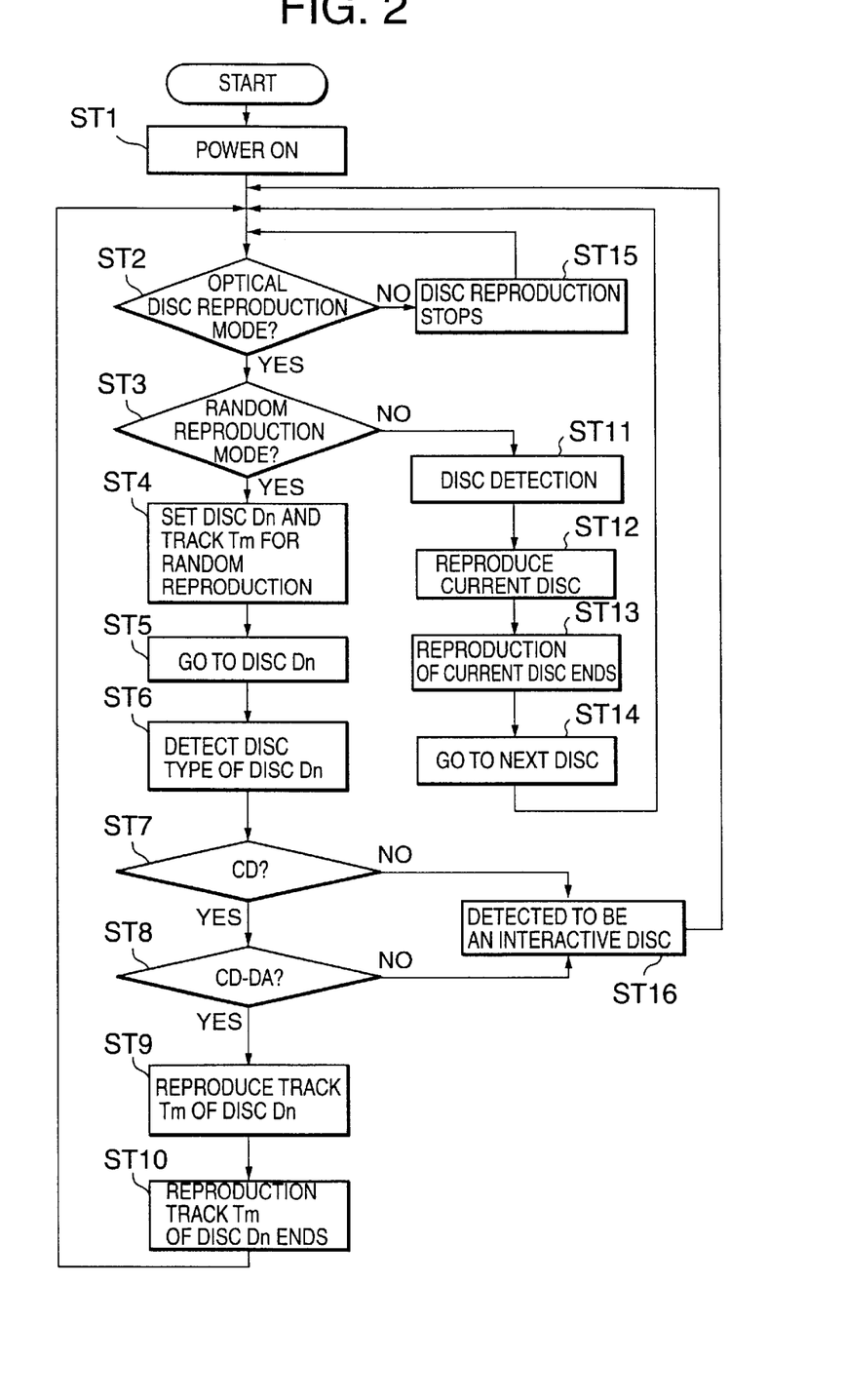
FIG. 2 is a flowchart showing the operation of the optical disc reproducing apparatus to which a first embodiment of the present invention is applied.

FIG. 2 is a flowchart explaining the operation of the optical disc reproducing apparatus to which the first embodiment of the present invention is applied.

First, the power source of the optical disc reproducing apparatus is turned ON (ST1), and after reproduction of the optical disc has been instructed by operating the control buttons on the user interface block unit 6 or the remote-control transmitter 8 (ST2), operation changes to the optical disc reproduction mode. As long as operation is not changed to the optical disc reproduction mode, or in other words, when there is been no reproduction instruction, the optical disc reproducing apparatus is in the disc reproduction stop mode (ST15).

Next, system controller unit 5 checks whether the reproduction mode received by the user interface block unit 6 is the random-reproduction mode (ST3). Here, the random-reproduction mode is set, for example, by pressing a reproduction-mode set button which is one of the control buttons provided on the remote-control transmitter 8 or the user interface block unit 6.

When the reproduction mode is not the random-reproduction mode, the system controller unit 5 controls all of the units of the optical disc reproducing apparatus to perform normal reproduction (ST11 to ST14).

In other words, the system controller unit 5 controls the roulette block unit 7 to convey the optical disc which is specified for reproduction by a disc selection control button which is one of the control buttons provided on the remote-control transmitter 8 or the user interface block unit 6, to the mechanical unit 1. The signal processing unit 2 uses the disc detection unit 204 to detect from the signal detected by the optical pickup 101 whether the optical disc to be reproduced is a CD or a DVD (ST11). Also, it stores the detection results in the memory unit 502 of the system controller unit 5 in correspondence with the number of the disc accommodation position where the optical disc is accommodated.

Next, after the optical disc type is detected by the signal processing unit 2, the system controller unit 5 switches all of the units of the optical disc reproducing apparatus to the signal processing circuits corresponding to the detected optical disc type, and then starts to reproduce recording information recorded on the optical disc (ST12).

After the reproduction of the optical disc being reproduced is finished (ST13), the system controller unit 5 controls the roulette block unit 7 to turn the roulette 702, and to move the next disc accommodation position after the disc accommodation position of the roulette 702 accommodating the optical disc which is just finished reproducing, to the mechanical unit 1. When there is an optical disc in the next disc accommodation position (for example, it is possible to detect an optical disc by installing a sensor comprising a pair of a light-emitting element and light-receiving element in the mechanical unit 1), the optical disc is taken to be the next optical disc to be reproduced (ST14), and processing of steps ST2 and ST11 to ST14 is repeated.

On the other hand, when the reproduction mode is the random-reproduction mode, the system controller unit 5 controls all of the units of the optical disc reproducing apparatus to perform random-reproduction operation (ST4 to ST10).

In other words, first, the system controller unit 5 selects at random one disc accommodation position from a plurality of disc accommodation positions in the roulette 702, and assigns the optical disc accommodated in the selected disc accommodation position to be a disc Dn. Also, the system controller unit 5 selects at random one track from the disc Dn, and temporarily sets the track to be a reproduction candidate track Tm (ST4).

Next, the system controller unit 5 controls the roulette drive unit 701 to turn the roulette and move the disc accommodation position selected in step ST4 to the mechanical unit 1. When the disc Dn is in the accommodation position, it is taken to be the optical disc to be reproduced next (ST5). Then, it moves this disc Dn to the reproduction position of the mechanical unit 1.

Next, the signal processing unit 2 uses the disc detection unit 204 to detect the disc type of the disc Dn (ST6).

When the detection result in step ST6 indicates that the disc Dn is not a CD, or in other words, indicates that the disc Dn is a DVD (No in step ST7), then there is a possibility that the disc Dn is an optical disc which has an interactive function, and when trying to reproduce it in the random-reproduction mode, there is a possibility that reproduction stops temporarily in the pause state (ST16). In this case, the information indicating that the disc Dn is a DVD is assigned to the number of the disc accommodation position where the disc Dn is accommodated, and stored in the memory unit 502 of the system controller unit 5. Processing then returns to ST2 and continues without reproducing the disc Dn.

On the other hand, when the detection result in step ST6 indicates that the disc Dn is a CD (Yes in step ST7), then the disc detection unit 204 detects whether the disc Dn is a CD-DA or a CD-I (ST8).

In detail, the system controller unit 5 sets all of the units to the CD reproduction mode and reads the information indicating the CD type (CD-DA or CD-I) in the TOC (Table of Contents) stored in the control information recorded area in the read-in area or outer periphery of read-in area of the disc Dn.

When the read information indicates that the disc Dn is a CD-I (No in step ST8), then there is a possibility that the disc Dn is an optical disc with an interactive function, and when trying to reproduce it in the random-reproduction mode, there is a possibility-that reproduction stops temporarily in the pause state (ST16). In this case, information indicating that the disc Dn is a CD-I is assigned to the number of the disc accommodation position where the disc Dn is accommodated, and stored in the memory unit 502 of the system controller unit 5. Processing then returns to ST2 and continues without reproducing the disc Dn.

On the other hand, when the read information indicates that the disc Dn is a CD-DA (Yes in step ST8), the system controller unit 5 assigns information indicating that the disc Dn is a CD-DA to the number of the disc accommodation position where the disc Dn is accommodated, and stores the information in the memory unit 502. Then, the controller unit 5 starts reproducing the track Tm on the disc Dn (ST9). After reproducing the track Tm of the disc Dn is finished (ST10), the system controller unit 5 returns the process to step ST2 and continues processing.

The first embodiment of the present invention has been described above.

In the above embodiment described above, in the random-reproduction mode, only CD-DAs are selected from the optical discs accommodated in the roulette 702 as optical discs to be reproduced. In other words, DVD and CD-I discs which are accommodated in the roulette 702 are not selected as optical discs to be reproduced. Therefore, the operator can perform random reproduction without the pause state occurring and reproduction being interrupted, even though the optical disc having an interactive function is not removed from the optical disc reproducing apparatus.

Next, a second embodiment of the present invention will be explained.

In the first embodiment described above, in a case of the random-reproduction mode, when the optical disc accommodated in the roulette 702 is a DVD, it is never selected as an optical disc to be reproduced. Contrary to this, in this embodiment, even though the optical disc accommodated in the roulette 702 is a DVD, as far as it has no interactive function, it can be selected as an optical disc to be reproduced.

The basic configuration of the optical disc reproducing apparatus to which this embodiment is applied is the same as that of the first embodiment shown in FIG. 1. Here, only the reproduction operation of the optical disc reproducing apparatus of this embodiment will be explained.

Figure 3:
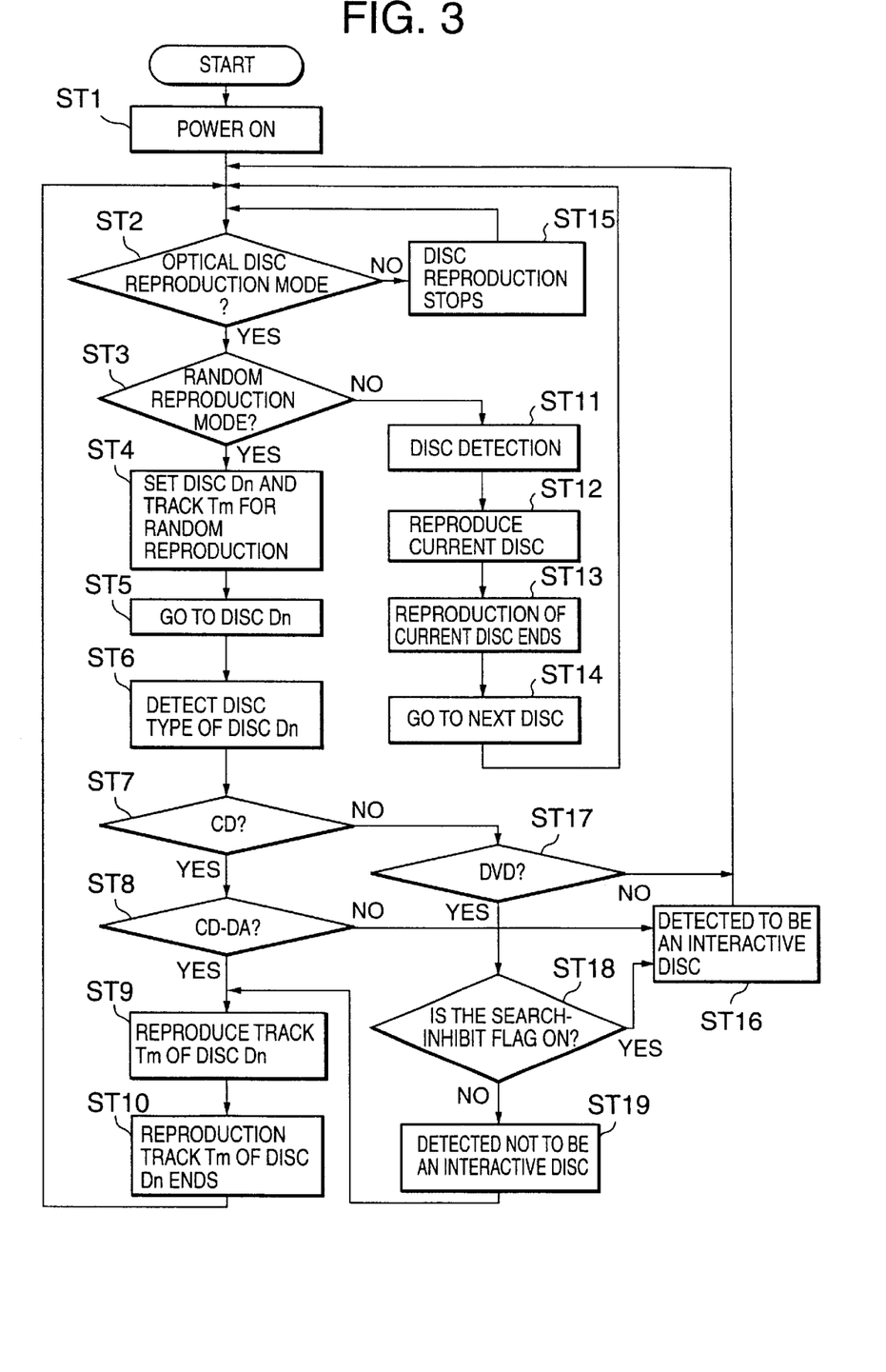
FIG. 3 is a flowchart showing the operation of the optical disc reproducing apparatus to which a second embodiment of the present invention is applied.

FIG. 3 is a flowchart showing the reproduction operation of an optical disc reproducing apparatus to which the second embodiment of the present invention is applied. In FIG. 3, steps ST1 to ST16 are the same as those shown in FIG. 2 and the explanation thereof will be omitted here. An explanation will be given of only steps ST17 to ST19.

When the detection result in step ST6 indicates that the disc Dn is not a CD (No in step ST7), the system controller unit 5 detects from the detection result of step ST6 whether or not the disc Dn is a DVD (ST17).

As a result of this, when the detection result in step ST6 does not indicate that the disc Dn is a DVD (No in step ST17), then the disc Dn is neither a CD nor a DVD. In this case, the system controller unit 5 detects that the disc Dn is an optical disc which cannot be reproduced by the present optical disc reproducing apparatus, and return to step ST2 without reproducing the disc Dn to continue processing.

On the other hand, if the detection result in step ST6 indicates that the disc Dn is a DVD (Yes in step ST17), then the system controller unit 5 sets all of the units to the DVD reproduction mode and reads the search-prohibit flag which is recorded in the program control information (PGCI) of the disc Dn.

When the search-prohibit flag is ON (Yes in step ST8), then the disc Dn contains some interactive program tracks. Therefore, when trying to reproduction the disc Dn in the random-reproduction mode, there is a possibility that reproduction could stop temporarily in the pause state (ST16). In this case, the system controller unit 5 assigns information indicating that the disc Dn is a DVD having an interactive function to the number of the accommodation position where the disc Dn is accommodated, and stores the information in the memory unit 502. Then the system controller unit 5 returns to step ST2 without reproducing the disc Dn to continue processing.

When all of the read search-prohibit flags are OFF (No in step ST8), the disc Dn does not contain any interactive program tracks. The system controller unit 5 assigns information, indicating that the disc Dn is a DVD without an interactive function, to the number of the accommodation position where the disc Dn is accommodated, and stores the information in the memory unit 502. Then, it starts to reproduce the track Tm on the disc Dn (ST9). After the reproduction of the track Tm on the disc Dn is finished (ST10), the system controller unit 5 returns to step ST2 and continues processing.

A second embodiment of the present invention has been explained above.

According to the above described second embodiment, in addition to the effects of the above first embodiment, in a case of the random-reproduction mode, even though the optical disc accommodated in the roulette 702 is a DVD, it is possible to select an optical disc as a reproduction target optical disc as long as it does not have an interactive function.

The preferred embodiments of the present invention have been explained, however the present invention is not limited to these embodiments and can be modified in various forms within the scope of the invention.

For example, in the embodiments described above, operation in the random-reproduction mode, where the optical discs accommodated in the roulette 702 are reproduced continuously and at random, was explained as an example, however, the present invention can be applied in the same way in the programmed-reproduction mode where a plurality of optical discs are selected in a predetermined order from the optical discs accommodated in the roulette 702. In this case, the judgment block in step ST3 in FIGS. 2 and 3 may be changed to a block for detecting whether or not the reproduction mode is the programmed-reproduction mode, and detecting the disc Dn and track Tm to be reproduced in step ST4 can be changed to be in accordance with the track reproduction order in the programmed-reproduction mode which is stored in advance in the memory unit 502.

The present invention can also be applied in combination of the random-reproduction mode and the programmed-reproduction mode.

Moreover, in the embodiments described above, in the reproduction mode, after the roulette 702 is rotated and the accommodation position where the disc Dn is accommodated is moved to the mechanical unit 1, the type of the disc Dn is detected (whether it is a CD or a DVD, and when it is a CD, whether it is a CD-DA or a CD-I, and when it is a DVD, whether or not it has an interactive program track). However, the present invention is not limited to this.

For example, when turning ON the power to the optical disc reproducing apparatus or when the reproduction-mode set button which is one of the control buttons provided on the user interface block unit 6 is pressed, it is also possible to rotate the roulette 702 and move each of the accommodation positions of the roulette 702 to the mechanical unit 1 to detect in advance the type of the optical discs accommodated in the accommodation positions, and then assign the detection results to the respective accommodation position and store it in the memory unit 502.

In addition, during random reproduction or programmed reproduction, it is also possible to detect the type of the disc Dn, which is selected to be reproduced, by checking the information stored in the memory unit 502 which corresponds to the accommodation position where the disc Dn is accommodated, and then perform operation according to the detected type (the disc is not reproduced when it is other than a CD-DA, or it is not reproduced when it is other than a CD-DA or a DVD with no interactive program tracks).

Moreover, in the embodiments described above, a case where, during random reproduction or programmed reproduction, a disc other than a CD-DA, or a disc other than a CD-DA or DVD with no interactive program tracks is not reproduced, was explained. However, the present invention is not limited to this. For example, the same operation may be performed even when the CD-DA is replaced by another CD with no interactive programs recorded on it.

Furthermore, in the embodiments above, an example of an optical disc reproducing apparatus with a so-called roulette-type changer was explained, however, the present invention may also be applied in a similar way to an optical disc reproducing apparatus with, for example, a magazine-type or rack-type changer.

As explained above, with the present invention, when discs, such as a DVD or CD-I, having an interactive function, are accommodated, these discs are not selected as discs to be reproduced in the random-reproduction mode or programmed-reproduction mode. Therefore, the operator can reproduce discs in the random-reproduction mode or programmed-reproduction mode without interrupting reproduction, even though optical discs with an interactive function are not removed from the optical disc reproducing apparatus.

What is claimed is:

1. An optical disc reproducing apparatus capable of accommodating a plurality of different kinds of optical discs, comprising:

disc detection means for detecting the kind of optical disc;

disc selection means for selecting an optical disc to be reproduced from among the accommodated optical discs; and mode receiving means for receiving a reproduction instruction, including at least one of a random-reproduction mode for continuously reproducing the accommodated optical discs at random and a programmed-reproduction mode for selectively reproducing the accommodated optical discs in a predetermined order, wherein:

said disc selection means only selects optical discs from among the accommodated optical discs which is detected by said disc detection means to be a CD-DA (Compact Disc-Digital Audio), when a reproduction instruction in said random-reproduction mode or programmed-reproduction mode is received by said mode receiving means.

2. The optical disc reproducing apparatus of claim 1, further comprising:

a disc type memory means for assigning information indicating the type of optical disc detected by said disc detection means to the accommodation position for each respective optical disc and storing the information therein, wherein:

said disc selection means only selects optical discs from the accommodation position to which information indicating that the type of the optical disc is CD-DA is assigned by said disc type memory means, when a reproduction instruction in said random-reproduction mode or said programmed-reproduction mode is received by said mode receiving means.

3. An optical disc reproducing apparatus capable of accommodating a plurality of different kinds of optical discs, comprising:

disc detection means for detecting whether an optical disc has any interactive program tracks;

disc selection means for selecting an optical disc to be reproduced from among the accommodated optical discs; and mode receiving means for receiving a reproduction instruction, including at least one of a random-reproduction mode for continuously reproducing the accommodated optical discs at random and a programmed-reproduction mode for selectively reproducing the accommodated optical discs in a predetermined order, wherein:

said disc selection means only selects optical discs from among the accommodated optical discs which is detected by said disc detection means to have no interactive program tracks, when a reproduction instruction in said random-reproduction mode or said programmed-reproduction mode is received by said mode receiving means.

4. The optical disc reproducing apparatus of claim 3, further comprising:

disc type memory means for assigning information indicating whether the optical disc has any interactive program tracks to the accommodation position for each respective optical disc detected by said disc detection means and storing the information therein, wherein:

said disc selection means only selects optical discs with information indicating that the optical disc has no interactive program tracks assigned by said disc type memory means, when a reproduction instruction in said random-reproduction mode or said programmed-reproduction mode is received by said mode receiving means.

* * * * *